United States Patent
Yamauchi

(10) Patent No.: US 11,068,202 B2
(45) Date of Patent: Jul. 20, 2021

(54) SEMICONDUCTOR MEMORY DEVICE AND RESET METHOD THEREOF

(71) Applicant: Winbond Electronics Corp., Taichung (TW)

(72) Inventor: Kazuki Yamauchi, Kanagawa (JP)

(73) Assignee: Winbond Electronics Corp., Taichung (TW)

(*) Notice: Subject to any disclaimer, the term of this patent is extended or adjusted under 35 U.S.C. 154(b) by 168 days.

(21) Appl. No.: 16/198,782

(22) Filed: Nov. 22, 2018

(65) Prior Publication Data

US 2019/0163401 A1 May 30, 2019

(30) Foreign Application Priority Data

Nov. 28, 2017 (JP) .............................. JP2017-227776

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0688; G06F 3/0679; G06F 3/0604; G06F 21/79
See application file for complete search history.

(56) References Cited

U.S. PATENT DOCUMENTS

| 9,025,390 | B2 | 5/2015 | Nakai et al. | |
|---|---|---|---|---|
| 2013/0145083 | A1* | 6/2013 | Suzuki | G06F 21/79 |
| | | | | 711/103 |
| 2015/0026393 | A1* | 1/2015 | Kaminaga | G06F 3/0611 |
| | | | | 711/103 |

FOREIGN PATENT DOCUMENTS

| CN | 100492542 | 5/2009 |
|---|---|---|
| JP | 2008300469 | 12/2008 |
| JP | 2014057077 | 3/2014 |
| TW | I285897 | 8/2007 |

* cited by examiner

*Primary Examiner* — Ernest Unelus
(74) *Attorney, Agent, or Firm* — JCIPRNET

(57) ABSTRACT

The disclosure prevents inconsistencies in a busy state between a master side memory chip and a slave side memory chip during a reset operation. A flash memory device (100) of the disclosure includes a master side memory chip (200) and at least one slave side memory chip (300). A controller (230) of the master side memory chip (200) selects the master side memory chip or the slave side memory chip based on an externally inputted address, and performs a reset of the selected memory chip when a reset command is inputted. The data read from a specific area of a memory cell array of the master side memory chip is set in a register. The controller (230) controls a readout of the reset in a manner that time required for setting the data of the register is longer than time required for the reset of the selected memory chip.

11 Claims, 7 Drawing Sheets

SEMICONDUCTOR MEMORY DEVICE AND RESET METHOD THEREOF

CROSS-REFERENCE TO RELATED APPLICATION

This application claims the priority benefit of Japan application serial no. 2017-227776, filed on Nov. 28, 2017. The entirety of the above-mentioned patent application is hereby incorporated by reference herein and made a part of this specification.

TECHNICAL FIELD

The disclosure is related to a semiconductor memory device having stacks of a plurality of dice or chips, and is related to a serial peripheral interface (SPI)-enabled flash memory.

BACKGROUND

A multichip package is formed by stacking a plurality of the same or different types of dice or chips in one package. For example, the storage capacity may be expanded by stacking the same type of memory chips, or by stacking different types of memory chips to provide different storage functions. For example, in the non-volatile semiconductor memory device of Patent literature 1, a plurality of memory array chips and a control chip for controlling the memory array chips are stacked, and the through electrode of the memory array chips and the through electrode of the control chip are aligned for the electrical connection of the two through electrodes. Moreover, in the semiconductor device of Patent literature 2, a master flash memory chip and a slave flash memory chip are stacked, a non-core circuit of the slave flash memory chip is omitted, and a signal and voltage required for the device operation are provided from the master flash memory chip to the slave flash memory chip.

PRIOR ART LITERATURE

Patent Literature

[Patent literature 1] JP 2008-300469
[Patent literature 2] JP 2014-57077

Issues to be Solved by the Disclosure

A memory device in which a plurality of memory chips are stacked is as follows: each memory chip monitors the address outputted from the host computer and detects whether itself is the selected memory chip. The host computer does not need a specific command for selecting the memory chip, and only needs to output the command or address to the memory device in the manner of processing a monolithic memory chip.

In addition, one of the stacked memory chips may be set as the master and the other as the slave, and the master chip or slave chip may be identified. The setting of the master/slave may be performed, for example, by a fuse or a metal option. For example, the identification (ID) of the master side memory chip is set to "00", the ID of the slave side memory chip is set to "01", the master side memory chip may be selected when BA10=L (block address "10" is L), and the slave side memory chip may be selected when BA10=H.

However, in the flash memory of such a monolithic stack, the situation in which the period when the master side memory chip is busy and the period when the slave side memory chip is busy are inconsistent may occur. For example, the following issue occurs: even if the master side memory chip is not in busy state, if the slave side memory chip is in busy state, then even if the slave side memory chip is selected according to the address from the host computer, the operation instructed by the host computer still cannot be executed in the slave side memory chip.

SUMMARY

The disclosure addresses this current issue, and aims to provide a semiconductor device that prevents inconsistency in the busy states between the master side memory chip and the slave side memory chip.

Technical Means for Solving the Issues

A semiconductor memory device of the disclosure includes a master side memory chip and at least one slave side memory chip, wherein the master side memory chip and the slave side memory chip are electrically connected, and the master side memory chip includes: a setting component setting a flag information when the slave side memory chip is selected and a specific command is externally inputted; a reset component performing a reset of the selected memory chip when a reset command is inputted and setting a data read from a specific area of a memory cell array of the master side memory chip in a register; a detecting component detecting whether the reset command is externally inputted when the flag information is set; and a control component controlling a readout of the reset component in a manner that a time required to set the data of the register is longer than a time required for the reset of the selected memory chip when the input of the reset command is detected.

A reset method of the disclosure is related to a semiconductor memory device, wherein the semiconductor memory device includes a master side memory chip and at least one slave side memory chip, the master side memory chip and the slave side memory chip are electrically connected, and the master side memory chip includes: a step of setting a flag information when the slave side memory chip is selected and a specific command is externally inputted; a step of detecting whether a reset command is externally inputted when the flag information is set; and a step of controlling a readout of a data in a manner that a time required for the data setting of a register is longer than a time required for the reset of the selected memory chip when the reset of the selected memory chip is performed and the data read from a specific area of a memory cell array of the master side memory chip is set in the register when the input of the reset command is detected.

A reset method of the disclosure is related to a semiconductor memory device, wherein the semiconductor memory device includes a master side memory chip and at least one slave side memory chip, the master side memory chip and the slave side memory chip are electrically connected, and the master side memory chip includes: a step of making a time required for a first operation longer than a time required for a second operation when the first operation is executed in the master side memory chip and the second operation is executed in the slave side memory chip in operation in response to an externally inputted reset command.

Effects of the Disclosure

According to the disclosure, when the slave side memory chip is selected and a specific command is externally inputted, a flag information is set, and when the flag information is set, the time required to set the data readout in the master side memory chip in register is made longer than the time required for the reset in the slave side memory chip. Therefore, the phenomenon that although the slave side memory chip is in busy state, the master side memory chip is not in busy state is prevented.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Hereinafter, the embodiments of the disclosure are described in detail with reference to figures. In a preferred form, the semiconductor memory device of the disclosure is a NAND flash memory formed by stacking a master side memory chip and one or a plurality of slave side memory chips. However, the semiconductor memory device of the disclosure may include a memory chip of a different type than a NAND memory chip such as a NOR memory chip or a dynamic random-access memory (DRAM). Further, the NAND flash memory may also be provided with a serial interface function capable of inputting and outputting data in synchronization with a clock signal.

EMBODIMENTS

Figure 1:
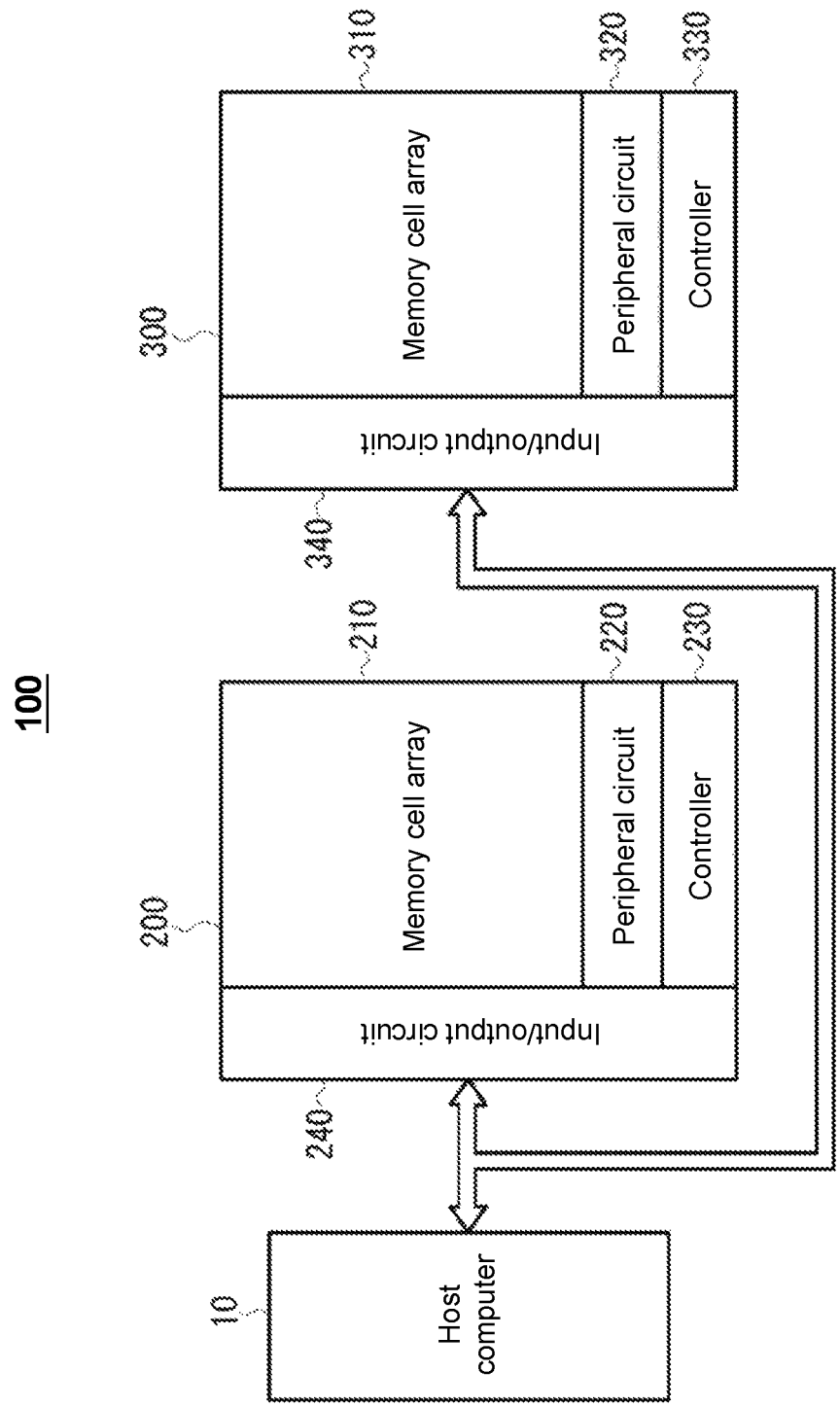
FIG. 1 is a view showing a schematic configuration of a flash memory device of a monolithic stack of an embodiment of the disclosure.

FIG. 1 shows a schematic configuration of a flash memory device of a monolithic stack of an embodiment of the disclosure. A flash memory device 100 includes a master side memory chip 200 (hereinafter referred to as a master chip) and at least one slave side memory chip 300 (hereinafter referred to as a slave chip). In the present example, one slave chip 300 is illustrated, but the flash memory device 100 may also include two or more slave chips. The flash memory device 100 includes, for example, a ball grid array (BGA) package or a chip scale package (CSP). For example, the BGA package is formed by mounting a stacked master chip and slave chip on a flexible circuit substrate via flip chip, or is connected to a circuit substrate by wire-bonding. The stacked master chip and slave chip are electrically connected to each other via a through-silicon via (TSV).

The master chip 200 includes: a memory cell array 210 including a plurality of NAND string units; a peripheral circuit 220 including a decoder or page buffer/sense circuit for selecting a row or column of the memory cell array; a controller 230 controlling the overall operation of the master chip 200; an input/output circuit 240 including a plurality of external terminals and an external interface for transmission and reception of signals and the like with a host computer 10. The slave chip 300 has the same configuration as the master chip 200. That is, the slave chip 300 includes: a memory cell array 310 including a plurality of NAND string units; a peripheral circuit 320 including a decoder or page buffer/sense circuit for selecting a row or column of the memory cell array; a controller 330 controlling the overall operation of the slave chip 300; and an input/output circuit 340 including a plurality of external terminals and an external interface for transmission and reception of signals and the like with the host computer 10.

The input/output circuit 240 of the master chip 200 and the input/output circuit 340 of the slave chip 300 may include, for example: an external terminal for data registration output, an external terminal for inputting a control signal (address latch enable, command latch enable), an external terminal that outputs a busy signal/ready signal, and a terminal for inputting a clock signal, and the like. However, the SPI-enabled flash memory device is operated with the interchangeability with a NOR flash memory. Therefore, an input terminal inputting data, an output terminal outputting data, a clock terminal inputting a clock, a chip select terminal, a light protect terminal, etc. should be included, and a terminal outputting a busy signal or a ready signal is not necessarily included. The master chip 200 and the slave chip 300 are connected to the host computer 10 via the input/output circuit 240 and the input/output circuit 340. The host computer 10 gives commands to the flash memory device 100 for reading, programming, erasing, and the like. The master chip 200 and the slave chip 300 monitor the address inputted from the host computer 10 via the input/output circuit 240 and the input/output circuit 340 and determine whether or not themselves are selected. The master chip 200 or the slave chip 300, when itself is selected, executes a command given by the host computer 10.

Figure 2:
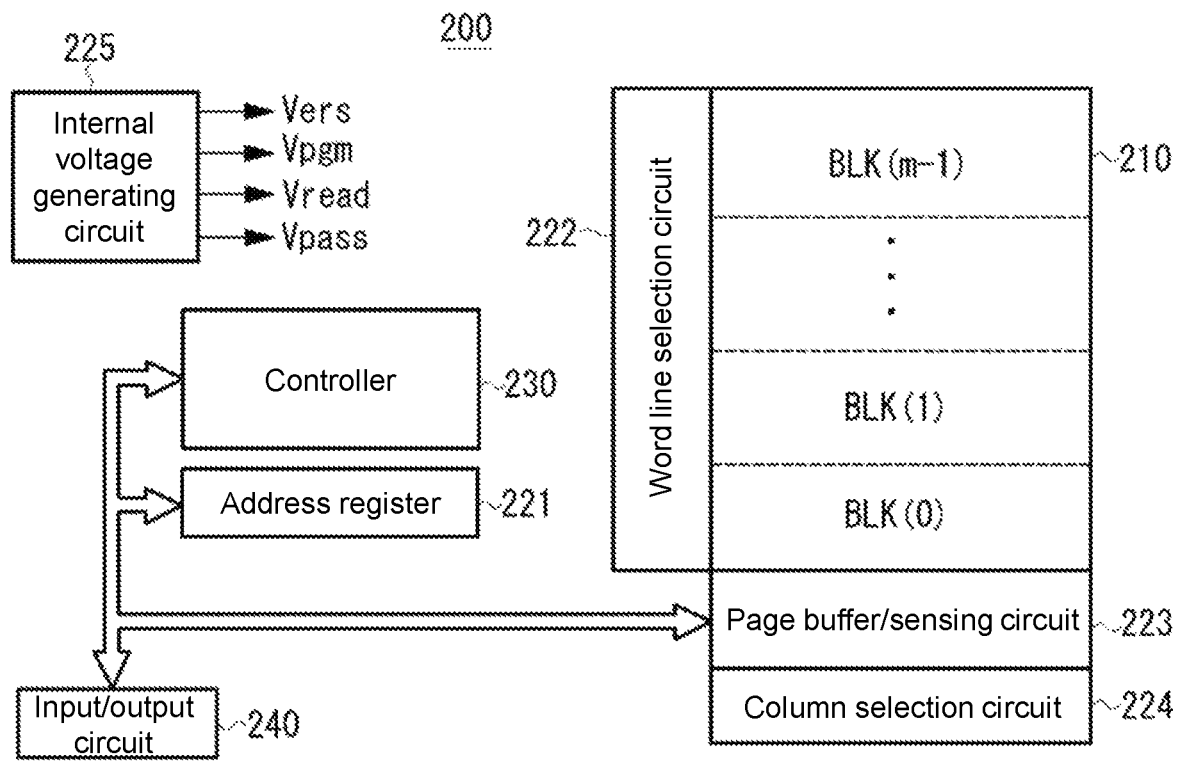
FIG. 2 is a block diagram showing a schematic configuration of a master side memory chip of an embodiment of the disclosure.
Figure 3:
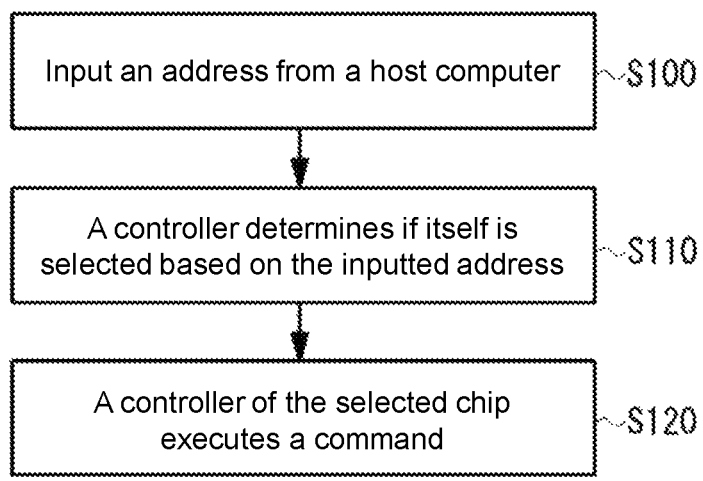
FIG. 3 is a flowchart illustrating the operation of chip selection in a monolithic stack of an embodiment of the disclosure.

Referring to FIG. 2, the master chip 200 includes: a memory cell array 210, wherein a plurality of memory cells are arranged in a matrix; a peripheral circuit 220 including: an address register 221 receiving address data via the input/output circuit 240; a word line selection circuit 222 receiving a row address information Ax from the address register 221 and decoding the row address information Ax and selecting a block and selecting a word line based on the decoding result; a page buffer/sensing circuit 223 holding the data read from a page selected by the free word line selection circuit 222 or holding the input data that should be programmed on the selected page; a column selection circuit 224 receiving a column address information Ay from the address register 221 and decoding the column address information Ay and selecting the data of the column address in the page buffer/sensing circuit 223 based on the decoding result; and an internal voltage generating circuit 225 generating various voltages (write voltage Vpgm, pass voltage Vpass, readout pass voltage Vread, erase voltage Vers, etc.) required for data readout, programming, and erasing and the like. The controller 230 receives a command data or the like from the input/output circuit 240 to control the operation of the master chip 200.

The memory cell array 210 has an m number of memory blocks BLK (0), BLK (1) . . . BLK (m−1) in the column direction. A plurality of NAND string units formed by connecting a plurality of memory cells in series are formed in one memory block. One NAND string cell includes a plurality of memory cells connected in series, a bit line side selection transistor, and a source line side selection transistor. The drain of the bit line side selection transistor is connected to a corresponding global bit line GBL, and the source of the source line side selection transistor is connected to a common source line SL.

The control gate of the memory cell is connected to the word line, and each gate of the bit line side selection transistor and the source line side selection transistor is connected to the selection gate line. The word line selection circuit 222 drives the bit line side selection transistor and the source line side selection transistor via the selection gate line based on the row address information Ax, thereby selecting a block or a word line.

In a read operation, a positive voltage is applied to the bit line, 0 V is applied to the selected word line, and a pass voltage is applied to the unselected word line, such that the bit line side selection transistor and the source line side selection transistor are turned on, and 0 V is applied to the common source line. In a programming operation, a high-voltage programming voltage Vpgm is applied to the selected word line and an intermediate potential is applied to the unselected word line, such that the bit line side selection transistor is turned on and the source line side selection transistor is turned off, and a potential corresponding to data "0" or "1" is supplied to the bit line GBL. In an erase operation, 0 V is applied to the selected word line in the block, a high voltage is applied to the P well, and the electrons of the floating gate are extracted to the substrate, thus erasing data in units of blocks.

Next, the selection operation of the master chip or the slave chip is described. The host computer 10 outputs a command or address or the like to the flash memory device 100 when the host computer 10 makes the flash memory device 100 execute a desired operation. The host computer 10 inputs an address to the master chip 200 and the slave chip 300 (S100), and the controller 230/controller 330 determines whether or not itself is selected (S110). When the controller 230/controller 330 determines that itself is selected, the controller 230/controller 330 executes a command from the host computer 10 (S120).

A reset function for initializing the device is provided in the flash memory device 100. If the host computer 10 issues a reset command to the flash memory device 100, then the controller 230 interprets the reset command and performs the reset of the selected chip. The reset executes a predetermined power-saving sequence in order to prevent the chip operation from ending in an abnormal state. For example, if reset is executed during a programming operation or an erase operation, then the charge pump circuit is stopped in accordance with the power-saving sequence. If the reset is further executed, then parameter information such as the operation conditions of the device stored in the configuration register or the like needs to be initialized. Therefore, the parameter information is reloaded in the configuration register. The parameter information is stored in a specific area of the memory cell array 210 of the master chip 200 available to the user, for example, page "0" of block "0", or is stored in a specific area of the memory cell array 210 that cannot be utilized by the user. When a reset command is inputted, in order to read the parameter information stored in the memory cell array 210 of the master chip 200 and reload the parameter information into the configuration register, the controller 230 automatically switches the selection of the chip to the master chip 200.

Figure 4:
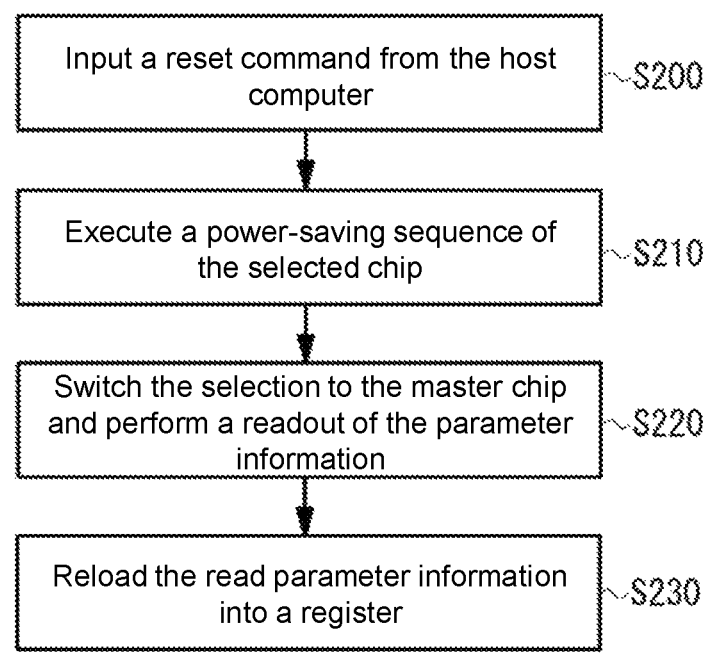
FIG. 4 is a flowchart illustrating the reset operation in a monolithic stack of an embodiment of the disclosure.

FIG. 4 is a view showing an operation flow when a reset command is inputted. If the controller 230 inputs a reset command from the host computer 10 (S200), then a power-saving sequence is executed in the selected chip (S210). At almost the same time, the controller 230 switches the selection of the chip to the master chip, and reads the parameter information from the specific area of the memory cell array 210 (S220) and reloads the read parameter information into the configuration register (S230). If the flash memory device 100 has an external terminal outputting a busy signal, then the busy signal is sent to the host computer 10 while the controller 230 is reading the parameter information.

Here, when the reset of the slave chip is performed, a time tRD required for the reload of the parameter information in the master chip is shorter than a time tRST required for the reset of the slave chip, and even if the slave chip is in a busy state, the master chip is not in a busy state. The time tRST required for the reset is different depending on the state when the selected chip is in operation. For example, if the selected chip is performing a reset in a readout operation, then the tRST is about 5 microseconds. In the case of a reset in the programming operation, the tRST is about 10 microseconds, and in the case of a reset in the erase operation, the tRST is about 500 microseconds. In contrast, the time tRD required for the reload of the parameter information is about 25 microseconds to 30 microseconds. Even if error checking and correction (ECC) is performed, the time tRD is still about 50 microseconds. As a result, if a reset command is inputted when an erase operation is performed in the selected slave chip, then the situation in which the reload of the parameter information in the master chip is ended before the reset in the slave chip is ended occurs. If the flash memory device 100 has an external terminal outputting a busy signal/ready signal, then the flash memory device 100 still outputs a ready signal even though the slave chip is in a busy state. In any case, even if the host computer 10 accesses the flash memory device 100 in this state, the slave chip in busy state still cannot perform the desired operation.

Figure 5:
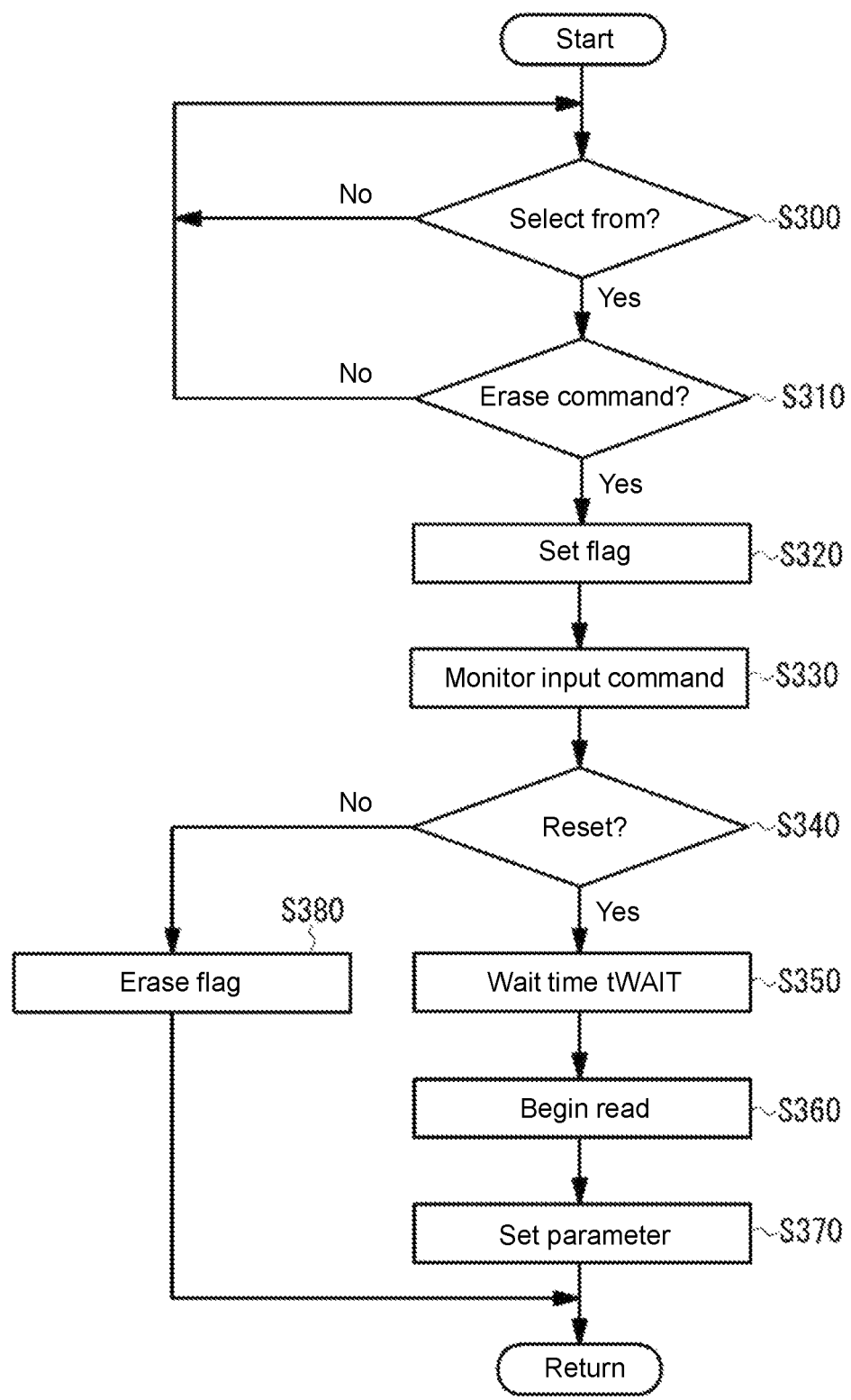
FIG. 5 is a flowchart illustrating the reset operation of a master side memory chip of an embodiment of the disclosure.
Figure 6:
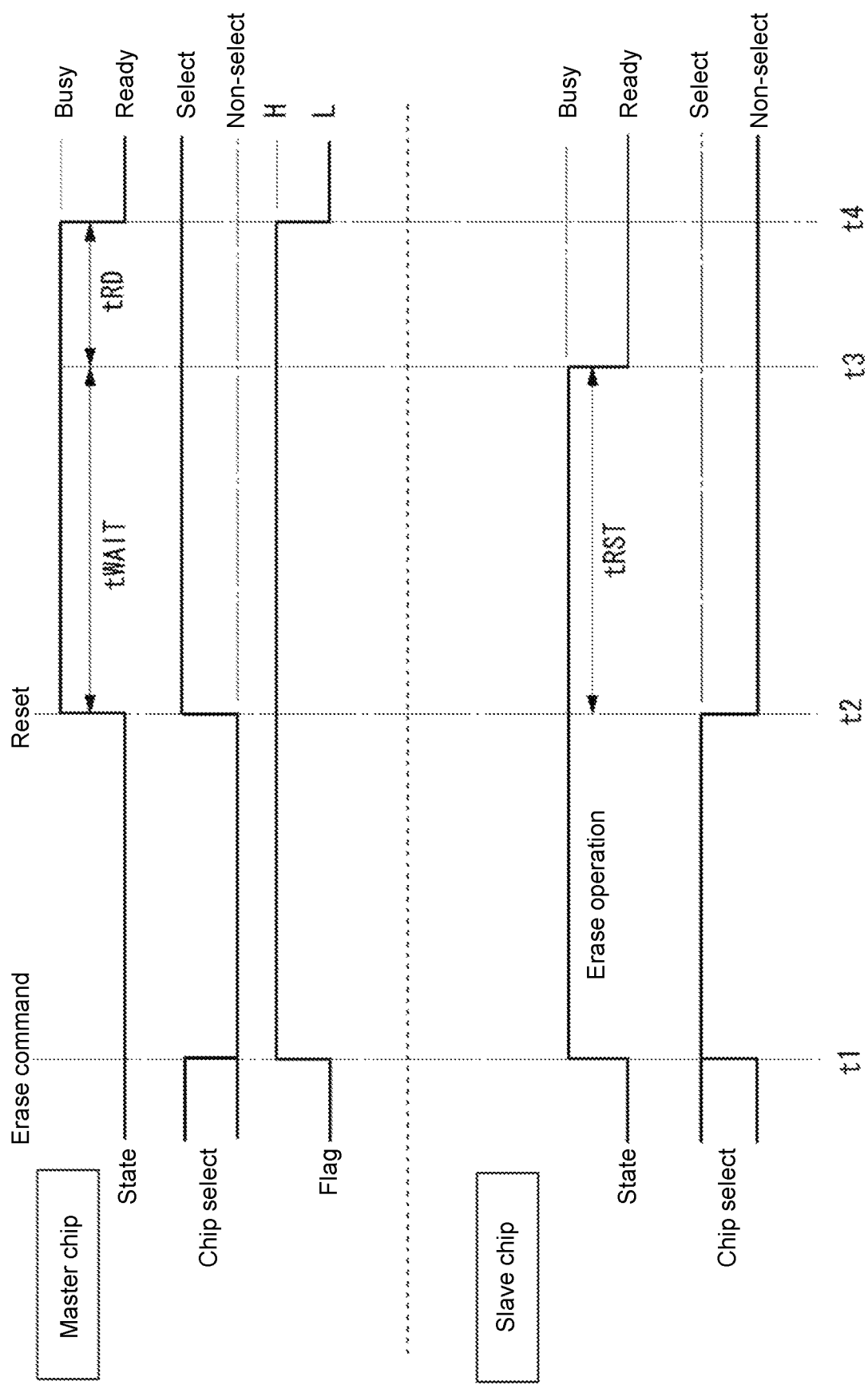
FIG. 6 is a timing chart showing the operation of each part in a reset operation of an embodiment of the disclosure.

In the present embodiment, in order to eliminate such a situation, the controller 230 controls the operation at the time of reset in accordance with the operation flow shown in FIG. 5 and the timing chart shown in FIG. 6. When the slave chip is selected (S300) and an erase command is inputted from the host computer 10 (S310), the controller 230 sets a flag (S320). As shown in FIG. 6, at time t1, when an erase command and an address of a block to be erased are inputted, in the case where the address of the block to be erased is the address of the slave chip, the controller 230 sets the flag to, for example, H.

When the flag is set, the controller 230 monitors the command inputted from the host computer 10 (S330) and detects the presence or absence of the input of the reset command (S340). When the input of the reset command is detected, the controller 230 waits for a predetermined time tWAIT (S350), then reads the parameter information (S360), and sets the read parameter information in the configuration register (S370). As shown in FIG. 6, if a reset command is inputted at time t2, then the controller 230 automatically switches the selection of the chip to the master chip, and reloads the parameter information at time t3 when the time tWAIT has elapsed. For example, the time tWAIT is set to be equal to the time tRST required for reset. Time t4 is the time at which the reload ends. Thus, the master chip is in busy state from time t2 when the reset command is inputted to time t4 when the reload is ended.

Moreover, the slave chip begins to be reset at time t2, and the reset is ended at time t3 at which point the time tRST has elapsed. The slave chip is in busy state from time t2 to time t3 when the reset command inputted, and the busy state of the slave chip must end before the busy state of the master chip.

In step S340 of FIG. 5, in the case that an input of a command other than the reset command is detected (S340), the controller 230 clears the flag setting to L (S380). Therefore, other operations are not affected.

As a result, according to the present embodiment, by delaying the reload of the parameter information when the reset command is executed by a predetermined time, the reload of the master chip may be ended after the reset of the slave chip is ended. As a result, when the reset is performed, the busy state of the master chip may be prevented from ending prior to the busy state of the slave chip. Further, the time tWAIT does not have to be the same as the time tRST required for the reset. In short, the time tWAIT only needs to be set by satisfying the relationship of (time tWAIT+ readout time tRD)>tRST.

Further, in the SPI-enabled flash memory device, the external terminal for outputting the busy signal/ready signal is not necessary, and therefore the busy signal is not outputted from the external terminal to the host computer 10. Moreover, when the flash memory device 100 is provided with an external terminal outputting a busy signal/ready signal, a busy signal corresponding to the busy state of the master chip is outputted from the external terminal to the host computer 10.

Furthermore, in the embodiment, the relationship in which the time tRST required for the reset in the erase operation is greater than the time tRD required for the reload of the parameter information caused by the reset is shown, but the disclosure is not limited to this relationship. In the case that the time tRST required for the reset in the programming operation is greater than the time tRD required for the reload of the parameter information, the disclosure may be applied similarly.

Further, in the embodiment, an example is described in which the flag is set when the slave chip is selected and an erase command is inputted, but this is an example, and any information that may select a slave chip and input an erase command for identification may be used. Further, in the embodiment, the master chip and the slave chip both exemplify a NAND flash memory, but the disclosure may also be applied to a master chip and a slave chip other than the NAND flash memory. In the case of a reset in such a memory chip, when different operations are executed between the master chip and the slave chip such that the busy times of the two are different, the reset operation is controlled in a manner that the busy time of at least the master chip is longer than the busy time of the slave chip.

Figure 7:
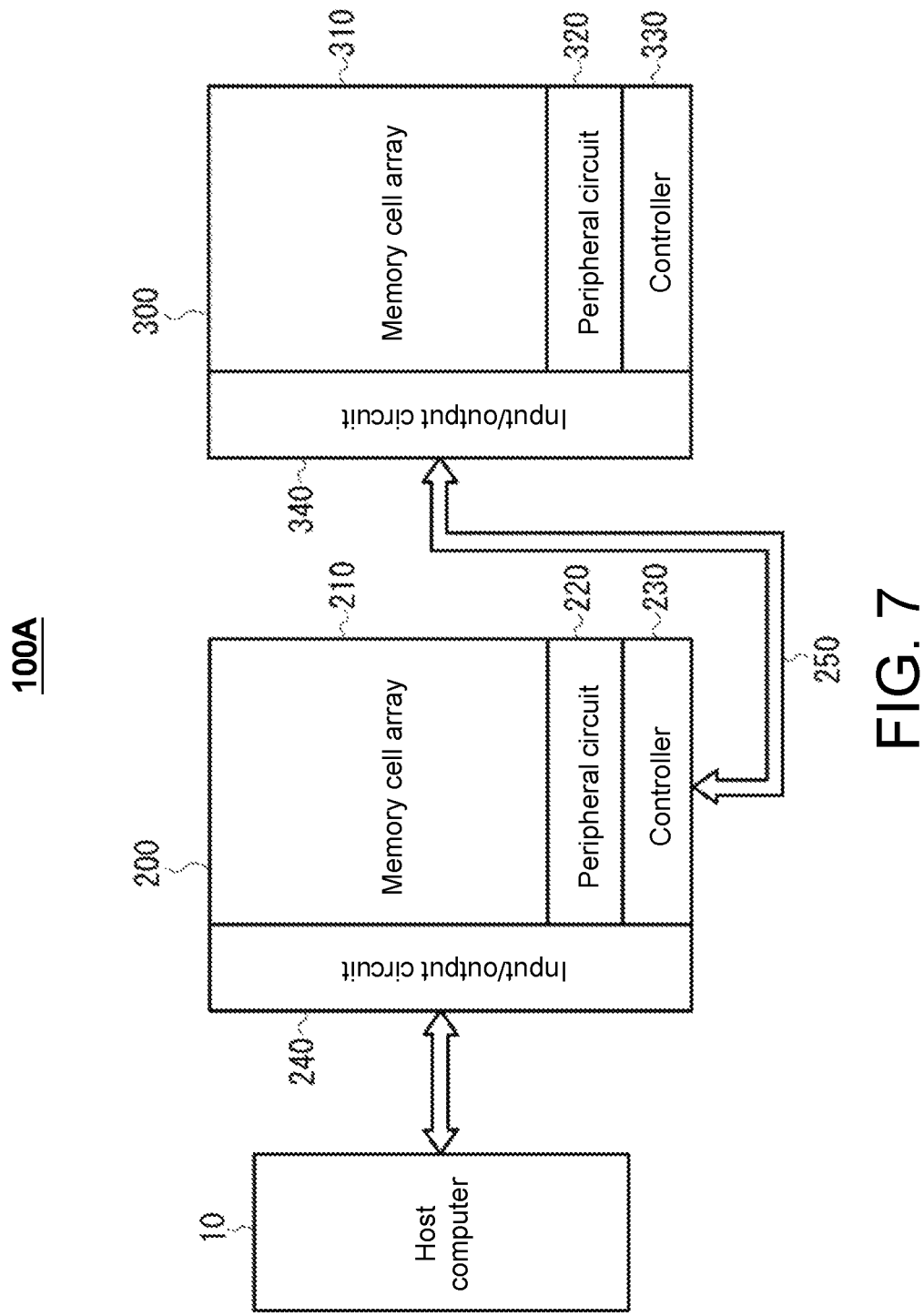
FIG. 7 is a view showing a schematic configuration of a flash memory device of a monolithic stack of another embodiment of the disclosure.

In the embodiment, an example in which the host computer 10 is connected to both the master chip 200 and the slave chip 300 and the address or command from the host computer 10 is inputted into two chips is shown, but the disclosure is not limited thereto. In a flash memory device 100A shown in FIG. 7, the host computer 10 may also be connected to the master chip 200 and the master chip 200 may be connected to the slave chip 300 via an internal bus 250. In this case, the controller 230 of the master chip 200 performs chip selection based on the address from the host computer 10. When the slave chip 300 is selected, a chip selection signal is outputted to the slave chip 300 via the internal bus 250. Further, the controller 230 of the master chip 200 outputs a signal for controlling various operations of the slave chip via the internal bus 250. Further, when the master chip 200 controls the slave chip 300, the controller 330 of the slave chip 300 may be deleted.

Figure 8:
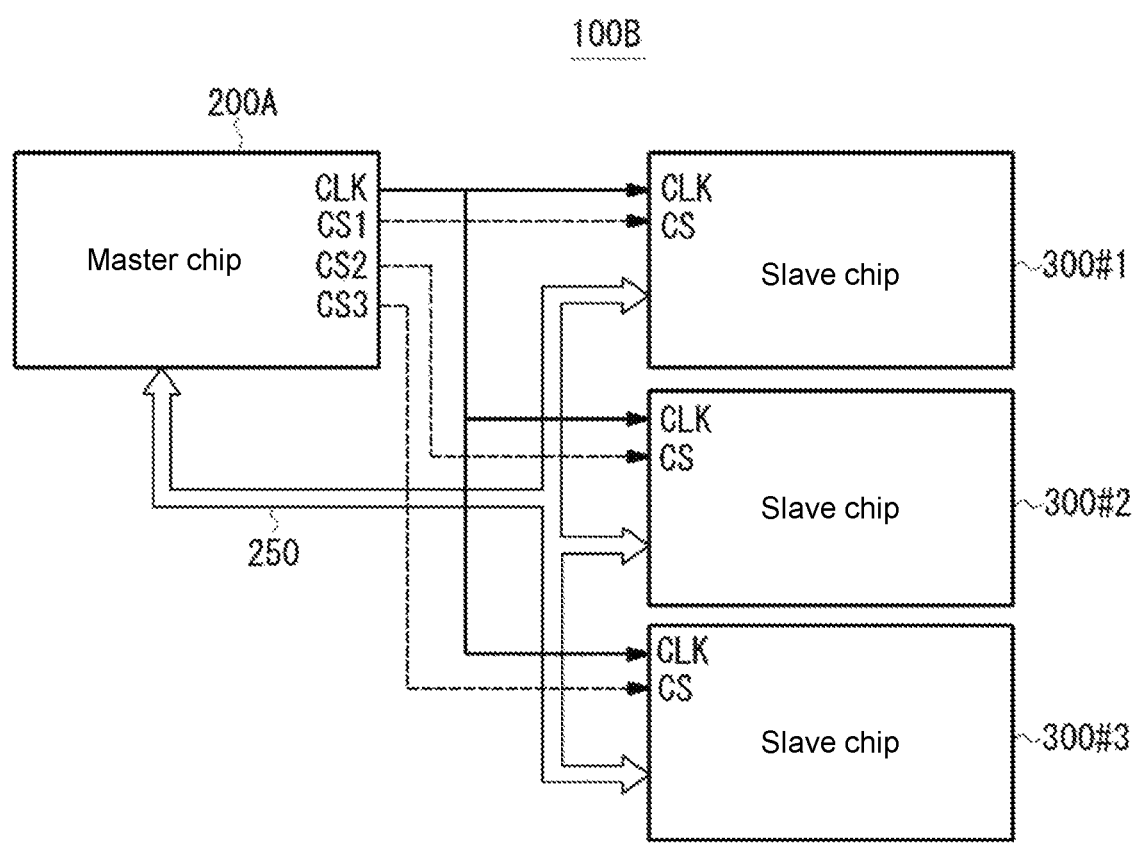
FIG. 8 is a view showing a schematic configuration of a flash memory device provided with an SPI-enabled monolithic stack of another embodiment of the disclosure.

FIG. 8 shows an example of the configuration of a flash memory device 100B provided with serial interface function. A master chip 200A respectively outputs a clock signal CLK to a slave chip 300#1, a slave chip 300#2, and a slave chip 300#3, and the slave chips may perform an operation synchronized with the clock signal CLK of the master chip. Further, the master chip 200A outputs a chip selection signal CS for selecting one of the slave chip 300#1, the slave chip 300#2, and the slave chip 300#3 to each of the slave chips. When the chip select signal CS is activated, the slave chip is enabled to be in an operable state. The master chip 200A linearly manages the memory cell array included in the master chip and the address space of each memory cell array included in each slave chip, and selects a chip having an address space conforming to the address inputted from the host computer 10. The master chip 200A and each of the slave chips 300#1, 300#2, and 300#3 are connected to each other via the internal bus 250 that transmits and receives data or a control signal. For example, when the slave chip 300#1 is selected, then the slave chip 300#1 is in an operable state, and the slave chip 300#1 supplies data, a control signal, high voltage (program voltage, erase voltage, verify voltage), etc. required for the operations of the slave chip 300#1 via the internal bus 250 and an internal interface (I/F).

Preferred embodiments of the disclosure are described in detail, but the disclosure is not limited to the specific embodiments, and various modifications and changes may be made within the scope of the disclosure recited in the claims.

What is claimed is:

1. A semiconductor memory device comprising a master side memory chip and at least one slave side memory chip, wherein the master side memory chip and the slave side memory chip are electrically connected, wherein,
    the master side memory chip comprises:
        a setting component setting a flag information from low position to high position when the slave side memory chip is selected and a specific command is externally inputted;
        a reset component executing a reset operation to reset the slave side memory chip and reloading a parameter information related to an operation condition into a register of the master side memory chip when a reset command is inputted, wherein the parameter information is read from a specific area of a memory cell array of the master side memory chip;
        a detecting component detecting the reset command being externally inputted when the flag information is set; and
        a control component controlling the reset component in a manner of ending a reload of the parameter information into the register of the master side memory chip after the reset operation of the slave side memory chip is ended, when an input of the reset command is detected while the flag information is set, wherein only after the reload of the parameter information of the master side memory chip is ended, the slave side memory chip is externally accessed.

2. The semiconductor memory device of claim 1, wherein, the control component starts the reload of the reset component after a predetermined time.

3. The semiconductor memory device of claim 1, wherein, the control component clears a setting of the flag information when an input of a command different from the reset command is detected.

4. The semiconductor memory device of claim 1, wherein, the specific command is an erase command.

5. The semiconductor memory device of claim 1, wherein, the reset component executes a power-saving sequence to end an operation of the selected memory chip.

6. The semiconductor memory device of claim 1, wherein the control component is configured to deselect the slave side memory chip and select the master side memory chip when the input of the reset command is detected while the flag information is set.

7. The semiconductor memory device of claim 2, wherein the predetermined time is set to be equal to a time required for executing reset operation to the slave side memory chip.

8. The semiconductor memory device of claim 1, wherein, the master side memory chip and the slave side memory chip are provided with a sequence interface function capable of inputting and outputting a data in synchronization with an externally supplied clock signal.

9. A reset method of a semiconductor memory device, wherein the semiconductor memory device comprises a master side memory chip and at least one slave side memory chip, wherein the master side memory chip and the slave side memory chip are electrically connected, wherein, the master side memory chip comprises:

a step of setting a flag information from low position to high position when the slave side memory chip is selected and a specific command is externally inputted;

a step of detecting a reset command being externally inputted when the flag information is set;

when an input of the reset command is detected, executing a reset operation to reset the slave side memory chip and reloading a parameter information related to an operation condition into a register of the master side memory chip, wherein the parameter information is read from a specific area of a memory cell array of the master side memory chip, and a step of controlling the reset operation in a manner of ending a reload of the parameter information into the register of the master side memory chip after the reset operation of the slave side memory chip is ended, when an input of the reset command is detected while the flag information is set, wherein only after the reload of the parameter information of the master side memory chip is ended, the slave side memory chip is externally accessed.

10. The reset method of the semiconductor memory device of claim 9, wherein:
the control step starts a reading of the parameter information after a predetermined time.

11. The reset method of the semiconductor memory device of claim 9, wherein:
the control step clears a setting of the flag information when an input of a command different from the reset command is detected.

* * * * *